United States Patent Office 3,338,548
Patented Aug. 29, 1967

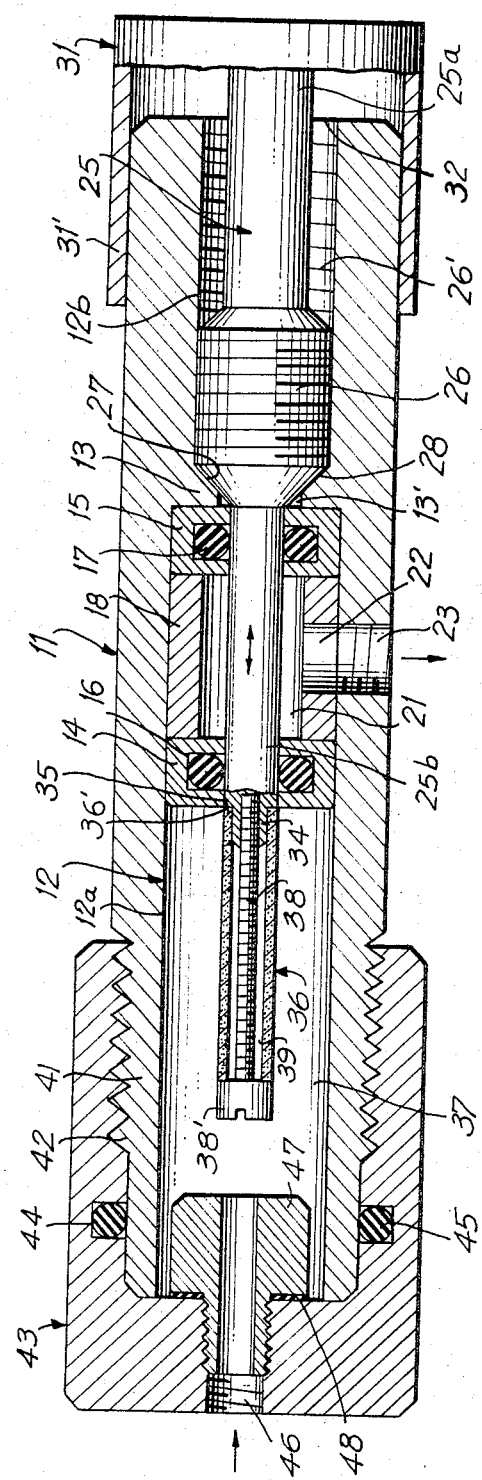

3,338,548
FLOW CONTROL VALVES
Lambert H. Mott, Hartford, Conn., assignor to Mott Metallurgical Corp., Hartford, Conn., a corporation of Connecticut
Filed Dec. 3, 1964, Ser. No. 415,701
5 Claims. (Cl. 251—121)

This invention relates to the art of flow control valves, more particularly of the type which permit precise regulation of the quantity of fluid flowing therethrough.

It is among the objects of the invention to provide a flow control valve which is relatively simple in construction, having few parts that may readily be fabricated at relatively low cost and which may readily be adjusted to permit the quantity of fluid flowing therethrough to be precisely regulate, which will operate over a wide range of pressures and which, when reset to a given position will provide substantially the same quantity of fluid flow at such reset position as originally provided.

According to the invention, these objects are accomplished by the arrangement and combination of elements hereinafter described and more particularly recited in the claims.

In the accompanying drawings the single figure shows a longitudinal sectional view of a flow control valve according to one illustrative embodiment of the invention.

Referring now to the drawing, the valve comprises an elongated cylindrical casing 11 having a bore 12 extending longitudinally therethrough. The bore 12 has a larger diameter portion 12a at one end and a smaller diameter portion 12b at its other end with an internal annular flange 13 positioned between said bore portions 12a, 12b.

Positioned in bore portion 12a adjacent flange 13 are ring members 14, 15 each having an annular groove 16 in its inner periphery in which a seal ring 17 is positioned. The ring members are spaced by a sleeve 18 positioned therebetween and the ring members and sleeve are retained in fixed position in bore 12a with ring member 15 abutting against the adjacent flat surface of flange 13 as by soldering or brazing.

Positioned in the bore 12 of the casing 11 is a stem 25 which has an enlarged diameter portion 26 between its ends, externally threaded to coact with the internal threads 26' in bore portion 12b.

The end of threaded portion 26 is frusto-conical as at 27 and is adapted to seat against the correspondingly conformed adjacent surface 28 of flange 13 to limit the inward movement of stem 25 when the latter is rotated as by a cap 31 secured to the end 25a thereof protruding from the end 32 of bore 12b.

The leading portion 25b of stem 25 extends through the opening 13' defined by annular flange 13 and through the bore 21 of sleeve 18 to define an annular discharge chamber which has a port 22 aligned with discharge port 23 in the casing 11, the sealing members 17 securely engaging said stem portion 25b to prevent leakage.

With the frusto-conical portion 27 of stem 25 seated against the flange 13, the free end 34 of portion 25b of stem 25, which is of reduced diameter, will extend beyond the ring member 14 as is clearly shown in the drawing. The reduced diameter portion 34 defines an annular shoulder 35 that is encompassed by the end 36' of a porous tube 36, preferably of sintered material such as bronze, said tube having an outer diameter preferably the same as that of stem portion 25b. The porous tube 36 which extends axially of stem 25 and is normally positioned in the chamber 37 defined by the bore portion 12a, is secured to the stem 25 by a screw 38 having a stem of diameter considerably less than that of the bore of the porous tube to define an annular chamber 39 in said tube. The free end of the screw is threaded into an axial internally threaded cavity in the free end 34 of stem portion 25b and when the head 38' of the screw abuts against the outer end of porous tube 36, the inner end 36' of the latter will be retained against shoulder 35.

The end 41 of the casing 11 is externally threaded as at 42 to receive an internally threaded cap 43 which has an internal annular groove 44 in which a seal ring 45 is positioned to provide a dependable seal between the cap and the casing.

The end wall of the cap 43 has a threaded inlet bore 46 and the stem of a hollow plug 47 is screwed into the inner end of port 46, a gasket 48 encompassing said stem to provide a seal.

In operation of the flow control valve, a line (not shown) having one end connected, for example, to a source of gas under relatively high pressure, has its other end connected to the inlet port 46 of the valve and a discharge line (not shown) leading to the low pressure side of the system to be supplied with a measured quantity of gas per unit time, is connected to outlet port 23.

With the stem 25 of the valve rotated to its innermost or closed position in which the frusto-conical surface 27 is abutting against seat 28, the inner end 36' of the porous tube 36 will be to the left of the seal retainer ring 14 as shown in the drawing.

At this time the gas under pressure will have filled chamber 37 and passed through the porous tube 36 into the annular chamber 39 thereof. Any gas under pressure seeping between the retainer member and the stem portion 25b will react against the O ring 17 in retainer 14 and since the pressure on the right side of the O ring is lower than that on the left side, the O ring will function in conventional manner to provide a dependable gastight seal.

To provide flow of gas from the valve, the cap 31 is rotated in direction to move the stem 25 to the right. As a result, when the end 36' of the porous tube 36 moves immediately to the right of the O ring 17 in retainer 14, a slight quantity of gas will escape and flow through the wall of the porous tube 36 into the low pressure chamber 21 to be discharged from the outlet port 23. As the pressure in the low pressure chamber 21 reacting on the left side of the O ring 17 in retainer 15 is greater than the pressure on the right side of the O ring, which is atmospheric, the O ring 17 will also be deformed to function in conventional manner to provide a gastight seal that will prevent leakage of gas past the complementary engaging threads of the stem portion 26 and the bore portion 12b.

It is apparent that with further rotation of cap 31 and movement of the stem 25, a greater amount to the right, more and more of the porous tube 36 will be exposed in low pressure chamber 21. Consequently, the quantity of gas under pressure that will flow from high pressure chamber 37 through the porous tube 36 into the low pressure chamber 21 will progressively increase as the cap is rotated.

Since the quantity of gas that will flow depends upon the extent of movement of the porous tube 36 to the right, it is apparent that by having precision threads on the enlarged portion 26 of the stem 25 and in the bore portion 12b, the quantity of gas flowing per unit distance of movement of the stem 25 may be extremely small so that precise quantities of gas may be metered.

Since the amount of surface area of the porous sleeve that is exposed per unit of movement of the stem may be precisely controlled, it is apparent that by calibrating the sleeve 31' of the cap 31 and the adjacent outer surface of the casing 11 of the valve, the valve can be reset to any desired position with assurance that with each resetting the quantity of gas that will flow per unit time will be substantially the same, assuming that the line pressure remains constant.

Since the flow control valve above described has relatively few parts, it is not likely to become deranged even with long use and since it may readily be disassembled, cleaning when necessary may be accomplished with a minimum of time and trouble.

If desired, the permeability of the porous tube 36 can be made to vary between its ends so that the quantity of gas that will flow per unit distance of travel of the stem can be made to vary in a non-linear manner.

As many changes could be made in the above unit, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. A flow control valve comprising a casing having a bore therethrough, said bore having a pair of spaced annular retainer members therein, each having an annular groove on its inner surface, a seal ring positioned in each of said annular grooves, one of said retainers defining a partition, the space between said retainers on one side of said partition defining a low pressure chamber and the portion of said bore on the other side of said partition defining a high pressure chamber, each of said chambers having a port, a porous tube in said high pressure chamber, said partition having a passageway for movement of said porous tube therethrough, a stem extending longitudinally in said casing bore and having a cylindrical portion extending through said annular seals, said stem having an enlarged portion with external threads thereon, said bore having a portion with internal threads coacting with the threads on said stem whereby upon rotation of said stem the latter will be longitudinally moved in said casing bore, said porous tube being secured at one end to the inner end of said stem and extending longitudinally thereof for movement of said porous tube through said passageway, said porous tube being mounted so that portions thereof may be in communication with both of said chambers for flow of fluid therebetween, an abutment in said bore for the enlarged portion of said stem to limit the inward movement of the latter, said porous tube, when said enlarged portion is against said abutment, being isolated from the space between said annular seal rings.

2. The combination set forth in claim 1 in which a screw extends longitudinally through said porous tube, the inner end of said stem having a reduced diameter portion defining an external annular shoulder, said reduced portion having an internally threaded recess to receive one end of said screw, the other end of said screw having a head adapted to abut against the adjacent end of said porous tube whereupon tightening of said screw the latter will retain the inner end of said porous tube against said annular shoulder.

3. The combination set forth in claim 2 in which the cylindrical portion of said stem and said porous tube have the same outer diameter, said screw being of diameter considerably less than the inner diameter of said porous tube.

4. The combination set forth in claim 3 in which a sleeve is positioned in said bore between said annular retainer members to space the latter, said sleeve having a radial port, said casing having radial port aligned with the port in said sleeve, the portion of said stem extending through said sleeve being of much smaller diameter than the bore of said sleeve to define the low pressure chamber therebetween.

5. The combination set forth in claim 3 in which the end of said casing defining said high pressure chamber has a closure cap thereon, the port leading into the high pressure chamber extending through said cap.

References Cited

UNITED STATES PATENTS

| 2,635,641 | 4/1953 | Kasten | 138—43 X |
| 2,645,450 | 7/1953 | Chessman | 251—325 X |
| 2,887,129 | 5/1959 | Stear | 138—43 |
| 2,925,243 | 2/1960 | Griswold | 251—284 X |
| 3,042,079 | 7/1962 | Swift et al. | 138—43 X |
| 3,168,111 | 2/1965 | Strauss | 251—121 X |

M. CARY NELSON, *Primary Examiner.*

R. C. MILLER, *Assistant Examiner.*